Inventor
Earl R Evans

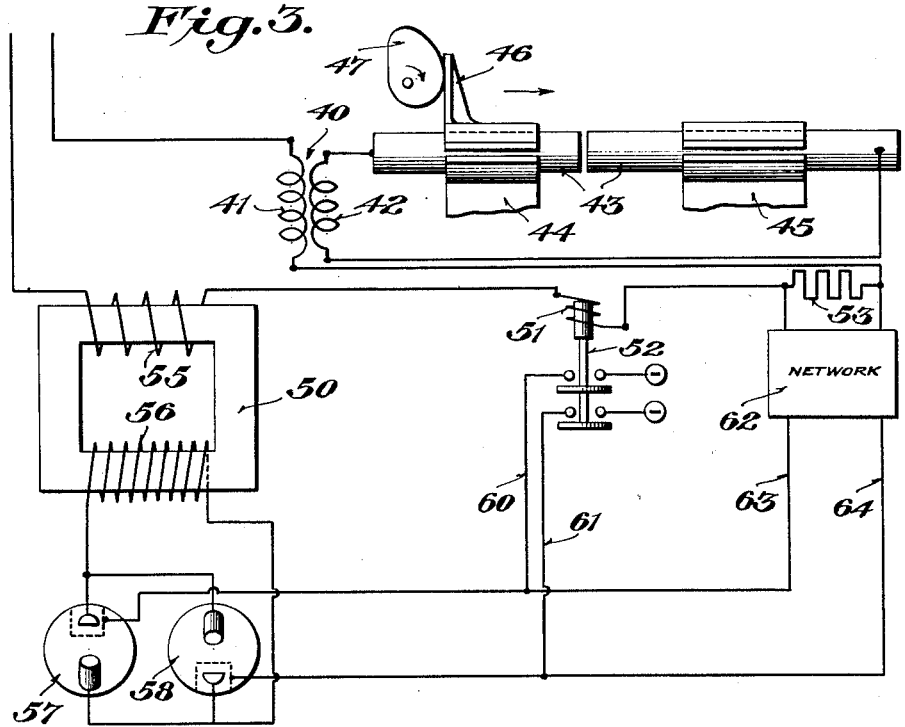

Patented Aug. 7, 1934

1,969,550

UNITED STATES PATENT OFFICE 1,969,550

ELECTRIC WELDING SYSTEM

Earl R. Evans, Washington, D. C.

Application June 24, 1930, Serial No. 463,495

8 Claims. (Cl. 219—4)

My invention relates to electric welding systems and more particularly to welding systems embodying means for regulating or controlling the current supplied to the welding apparatus or to the work.

It is often desirable to maintain the current in electric welding apparatus substantially constant or to obtain a predetermined and uniform variation. It has been proposed to use for this purpose electromagnetic regulating means or similar apparatus which is of complicated construction or relatively sluggish in its response. While such apparatus may reduce the percentage of imperfect welds obtained, it is only partially effective and is subject to many difficulties. In accordance with the present invention, a regulator system is provided which is substantially instantaneous in operation, which does not embody any moving parts and which has other advantages.

In order to accomplish these and other objects of the invention, means including an arc-discharge device is disposed in the welding circuit or in a circuit associated therewith, the discharge device being preferably controlled in such a manner as to maintain the welding current constant or produce a predetermined variation therein.

The arc-discharge device may be of the grid-controlled, gas or vapor-discharge type, one embodiment of which is described in Langmuir Patent #1,289,823 issued December 31, 1918. A discharge device of this character differs from space discharge devices operating with a pure electron discharge particularly in that it has a large current-carrying capacity and low internal voltage drop so that it is adapted to operate at high efficiency and carry large currents. Other arc discharge devices may be employed if desired, the present invention being concerned with the application of such devices to the problems encountered in electric welding, whether arc welding, resistance welding or flash welding.

For a clearer understanding of the invention, reference should be had to the accompanying drawings wherein several embodiments of the invention are illustrated by way of example. In the drawings—

Fig. 3 is a similar view of apparatus for flash welding.

Figure 1:
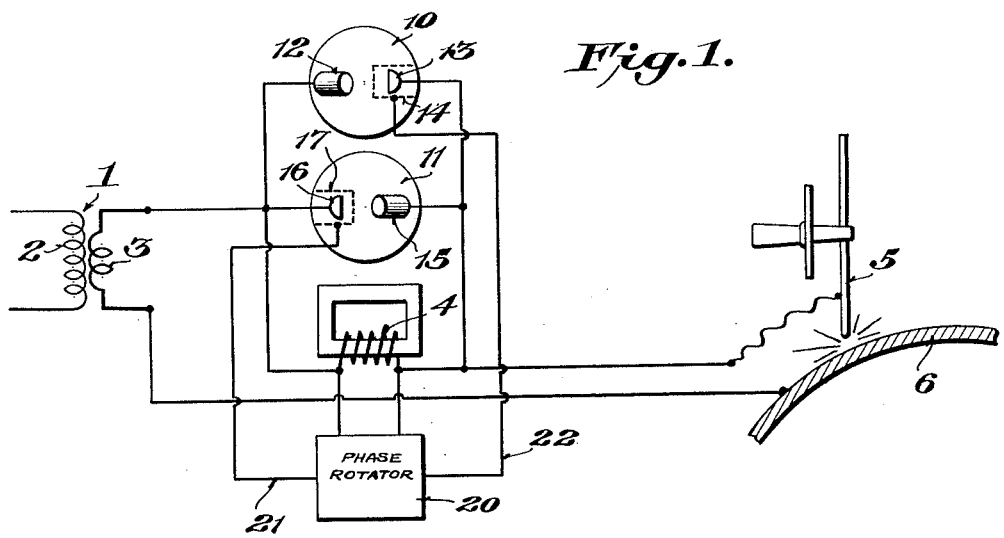
Fig. 1 is a diagrammatic view of an arc-welding system embodying the invention.

Referring to Fig. 1, an alternating-current welding system is shown comprising a welding transformer 1 having primary and secondary windings 2 and 3 respectively, and a series impedance 4 in the welding conductors extending between the transformer 1 and welding apparatus 5 and 6. The elements 5 and 6 may comprise a manual or automatically fed weldrod and a work piece, as shown, or other welding apparatus, for example, for making resistance or flash welds.

The frequency of the current supplied to the transformer 1 and the welding apparatus may be of the order of 60 cycles or may be much higher, for example, 500 cycles, the control apparatus to be described functioning properly with such frequencies. The currents and voltages employed may be widely varied depending upon the size and character of the weldrod or other welding apparatus or of the work piece or parts to be welded.

The impedance 4 is shown as reactive impedance but a non-inductive resistance or both resistance and reactance may be employed, the primary purpose of the impedance being to limit the current therethrough below the value actually desired at the weld. A shunt path or bypass circuit of variable impedance comprising arc-discharge devices 10 and 11 is provided around the impedance 4. The devices 10 and 11 are so controlled that the average current traversing the welding conductors and weldrod 5 is maintained substantially constant at the desired value and uniform welds may be made by unskilled operators. In case the feed and traverse of the weldrod and/or the work are effected automatically, a uniform feed and movement of the weldrod together with a constant energy input to the point of welding will insure a large percentage of satisfactory welds. Likewise, where this system is applied to resistance welding such, for example, as indicated diagrammatically in Fig. 2, the uniform energy input contributes to the formation of uniform welds and other desired results.

As stated above, the impedance 4 is of such value that the current therethrough is somewhat less than that desired at the weld. A variable increment of current to produce the desired welding current is supplied through the arc-discharge tubes 10 and 11 in shunt relation to the impedance 4. The arc-discharge devices 10 and 11 are shown as tubes of the type shown and described in the above-mentioned Langmuir patent in which control of the current is effected by de-ionization of the arc path and a controlled delay of the re-striking of the arc, but other arc-discharge devices of controllable impedance may be used.

The discharge tube 10 shown comprises a cathode 12, anode 13 and control grid 14 completely shielding the anode. Likewise the tube 11 comprises a similar cathode 15, anode 16 and grid 17. The cathodes are adapted to emit electrons and may be heated in the usual manner or otherwise adapted to operate at an elevated temperature. The tubes are provided with a gasfilling of such character and pressure, depending upon the shape and arrangement of the electrodes, that when an alternating potential is applied to the cathode and anode, the average current through the tube depends upon the potential of the grid and if the potential is more negative than the so-called critical potential, no current will traverse the tube. The critical potential may be either positive or negative and the control may be effected with an alternating grid potential if of the proper phase relation to the anode potential.

Thus, as shown in the drawings, the grid potentials may be derived from the impedance 4 in such a manner that the control potentials vary in accordance with the current traversing the impedance or a function thereof, a phase rotator 20 being provided if necessary to insure the proper phase relation between the cathode-anode potentials and the respective control potentials.

The grids 17 and 14 are shown as connected to the phase rotator 20 through the conductors 21 and 22 respectively. Such a control is described and claimed broadly in my Patent No. 1,914,350, granted June 13, 1933.

With the arrangement shown, the cathode-anode potentials, being proportional to the drop across the impedance 4, vary in accordance with the current traversing the impedance. Likewise the magnitude of the control potentials vary in accordance with the voltage drop across the impedance 4 or a function thereof. Under normal conditions, the average current traversing the tubes 10 and 11 is relatively small. If on account of a variation in the arc resistance at the weld, the arc current tends to increase, the voltage drop across the impedance 4 becomes slightly larger and the potentials applied to the control grids 14 and 17 become more negative, thereby reducing the current through the shunt path including the tubes 10 and 11 and maintaining the average current at the weld substantially constant. If on the other hand, the arc or welding current tends to decrease, the grid potentials become more positive and a greater current traverses the shunt path including the tubes 10 and 11.

It will be understood that the critical potential of the grids with respect to the cathodes may be either positive or negative. In either event, when the grid potential becomes more positive, an arc will strike between the cathode and anode earlier in each half-cycle when the cathode is negative with respect to the anode, the arc being extinguished and the arc-path partially de-ionized at the end of each half-cycle when the voltage falls to zero. In this manner the average impedance of the arc-discharge devices is controlled in accordance with the magnitude and phase relation of the grid potentials. Obviously other types of arc-discharge devices of controllable impedance may be employed if desired. All arc-discharge devices are intended to come within the scope of the invention, if of controllable impedance, as I believe that I am the first to disclose any such device in welding apparatus of the character described. Inasmuch as the described regulating apparatus operates without any time-delay, which is necessary to secure adequate compensation for the rapid changes which may occur in the welding arc, I believe that the system disclosed is the first practical system operative to maintain substantially constant current or energy input to the welding conductors or to the point of weld.

The arc-discharge device may also be employed to obtain a rapid, uniform, predetermined variation of the welding current or energy. It has been found desirable to vary the welding current or energy, particularly in connection with the resistance welding of thin sheets, to obtain what has been called a "stitch" weld. In the welding of thin sheets, it is difficult to employ sufficient current and time of application without burning or melting the sheet metal in spots, causing an imperfect weld. It has been found that this difficulty may be overcome by rapidly varying the current, for example several times a second, above and below the average value. Prior systems for accomplishing this result have been so complicated and difficult to control that the method has not come into general use.

Figure 2:
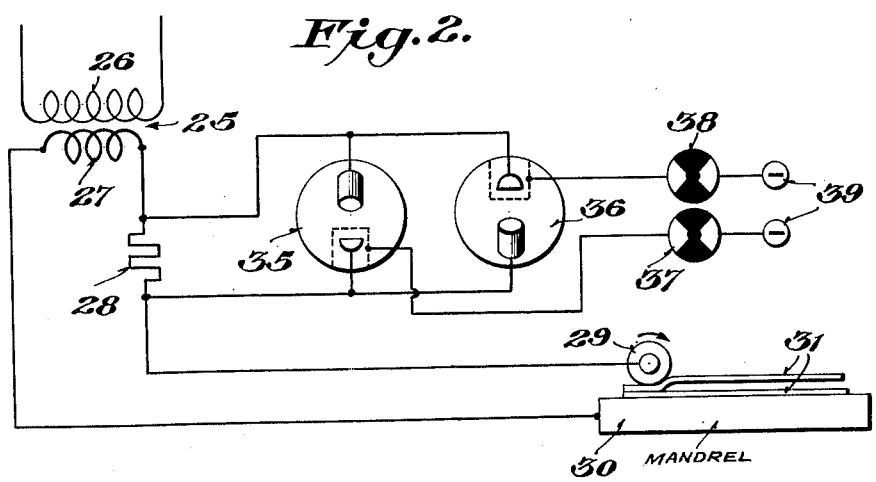
Fig. 2 is a similar view of a system, wherein a variable welding current is utilized in resistance welding.

A simple arrangement for effecting this result, which overcomes the difficulties encountered with prior systems, is shown in Fig. 2. Referring to this figure, a welding transformer 25 is shown comprising a primary winding 26 and a secondary winding 27. A stabilizing impedance 28, shown as a non-inductive resistance although an inductive impedance may also be used, is connected to the secondary winding 27 of the transformer in series with the welding circuit extending to a roller welding electrode 29 and mandrel or support 30 for the sheets or plates 31 to be welded together. The work pieces 31 are simply illustrative of parts adapted to be welded together by resistance welding in a system embodying the invention.

Arc-discharge devices 35 and 36 are arranged in shunt relation to the impedance 28 and provide a shunt path of low resistance when the potentials of the grids of the tubes 35 and 36 are more positive than the critical potential. Periodic circuit-closing devices, shown as rotating commutators 37 and 38, are arranged to connect and disconnect negative potentials as indicated at 39 from the grids of tubes 35 and 36. The frequency of the "stitching" is determined by the rate of rotation of the commutators and may be from 5 to 10 times per second for example. The commutators 37 and 38 rotate together, so that control of the impedances of both tubes 35 and 36 is effected simultaneously. As the electrode 29 is fed along the seam to be welded, the variation of the impedance of the path through the tubes 35 and 36 in shunt to the impedance 28 causes a fluctuation of the welding current at a uniform rate between predetermined maximum and minimum values to produce a weld having the desired characteristics.

The regulating apparatus shown in Fig. 1 may also be applied to flash welding and may be connected in either the primary or secondary circuit of the transformer. A system for making so-called "flash" welds is shown in Fig. 3, with the regulating apparatus disposed in the primary circuit of the transformer. A welding transformer 40 comprising primary and secondary windings 41 and 42, respectively, is connected to work pieces 43 to be welded together. The workpieces 43, which may be bars, angle irons, pipes or the like, are held in suitable clamps 44 and 45. The clamp 44 is movable and is provided with a lug 46 adapted to be engaged by a cam 47 to effect the usual movement thereof to produce a "flash" weld. In making such a weld, the work pieces are first lightly engaged, with a gradual relative movement until the ends are heated to the welding temperature, whereupon the pieces are pressed together and the current shut off.

Included in the circuit of the primary winding 41 are a regulating impedance 50, an operating winding 51 of a relay 52 and a resistor or impedance 53. The regulating impedance 50 comprises inductively related windings 55 and 56 which may be disposed upon a magnetizable core member. The secondary winding 56 is adapted to be short-circuited by the arc-discharge devices 57 and 58 to control the impedance of the circuit of the transformer 40. The grid elements of the tubes 57 and 58 are connected to the contacts of the relay 52 through the conductors 60 and 61. During the initial heating or "flashing" in making a weld, the tubes 57 and 58 operate to maintain a substantially constant current to the work pieces, the tubes being controlled by the network 62 in shunt relation to the resistor 53. The arrangement and operation in this connection are substantially the same as in the modification shown in Fig. 1, the network 62 being connected to the grid or control elements of the tubes 57 and 58 through conductors 63 and 64 to control the impedances of the tubes in accordance with slight variations in the welding current. When the final stage of the process is reached and the work pieces are forced together to complete the weld, the increase in current operates the marginal relay 52 to apply negative potentials to the grid elements of tubes 57 and 58 to thereby limit the current below the value which would otherwise obtain. If desired the relay 52 may be provided with a locking contact to hold the armature in the actuated position after being operated. The relay 52 may also be arranged to open the circuit of the welding transformer.

It will be apparent that the regulating means described will operate to render successive welding operations more nearly uniform and less dependent upon the skill of an operator in moving the work pieces and cutting off the current after the weld is completed. Various modifications of the several embodiments of the invention shown and described above will occur to those skilled in the art and are intended to come within the scope of the invention if within the terms of the appended claims.

I claim:

1. In a welding system, means including an arc-discharge device for regulating the welding current during the welding operation and means for controlling said device to limit the current at the termination of the welding operation.

2. A welding system for making stitch welds comprising an electrode, an arc discharge device arranged to carry at least part of the welding current to said electrode, means for periodically varying the impedance of said device and means for supplying current to said electrode independently of said discharge device.

3. A welding system for making stitch welds comprising cooperating welding electrodes, a constant impedance in series therewith, a circuit in shunt relation to said impedance to bypass current to the electrodes, an arc discharge device in said circuit and means for periodically varying the impedance of said device.

4. Welding apparatus comprising a source of welding current, welding electrodes, a circuit connecting said electrodes to said source of welding current, an impedance connected in series relation with said circuit, an arc discharge device connected in shunt to said impedance and provided with a control electrode for varying its conductivity, and means for variably energizing said control electrode in accordance with variations in the current traversing said impedance to minimize current fluctuation at said welding electrodes.

5. A welding system comprising a transformer having a primary and a secondary winding, welding apparatus connected to said secondary winding, an impedance connected between said secondary winding and said welding apparatus, a bypass circuit around said impedance, an arc-discharge device in series relation with said bypass circuit and means for controlling the impedance of said discharge device to thereby affect the welding current.

6. A welding system comprising a transformer having a primary and a secondary winding, an arc-welding electrode connected to said secondary winding, a fixed impedance between said secondary winding and said electrode, a bypass circuit around said impedance, an arc-discharge device in series relation with said bypass circuit and means for varying the impedance of said discharge device in a manner to minimize variations in the current supplied to said welding electrode resulting from variations in the welding arc or other causes.

7. Flash welding apparatus comprising means for first lightly engaging with a gradual relative movement the ends of parts to be welded together and then forcing said ends together to complete the weld, means for supplying current to said parts, means including an arc discharge device for regulating the current flowing through said parts while lightly engaging one another, and means responsive to the increase in current flow through said parts when they are forced together for limiting the current flow through said parts.

8. Welding apparatus comprising a source of welding current, welding electrodes, means including an impedance for connecting said welding electrodes to said source of current, a bypass circuit around said impedance, an arc discharge device in series relation with said by-pass circuit, and means for controlling the impedance of said discharge device thereby to affect the welding current.

EARL R. EVANS.